United States Patent

[11] 3,627,958

| [72] | Inventors | Douglas D. Liedel<br>Belleville;<br>Lars J. Hierta, Westland, both of Mich. |
|---|---|---|
| [21] | Appl. No. | 15,126 |
| [22] | Filed | Feb. 27, 1970 |
| [45] | Patented | Dec. 14, 1971 |
| [73] | Assignee | Western Sales Corp.<br>Southfield, Mich. |

[54] MAGNETIC HORN SWITCH
11 Claims, 6 Drawing Figs.

[52] U.S. Cl. ....................................... 200/61.54,
335/205
[51] Int. Cl. ..................................................... H01h 9/00
[50] Field of Search .................................. 200/61.54–61.57,
61.27–61.38; 74/552; 335/205

[56] References Cited
UNITED STATES PATENTS

| 3,322,917 | 5/1967 | Furlow ........................... | 335/205 |
| 3,402,269 | 9/1968 | Gregory ......................... | 335/205 |
| 3,524,032 | 8/1970 | Conterno ....................... | 200/61.54 |

*Primary Examiner*—Robert K. Schaefer
*Assistant Examiner*—M. Ginsburg
*Attorney*—Fisher and Schmidt ABSTRACT: In a steering wheel hub, rim and rib assembly, appliance-operating means including a switch in the hub, electrical circuitry connecting the switch to an appliance, magnetic flux generating means in the hub, and means for directing the magnetic flux to the switch to close same and operate the appliance.

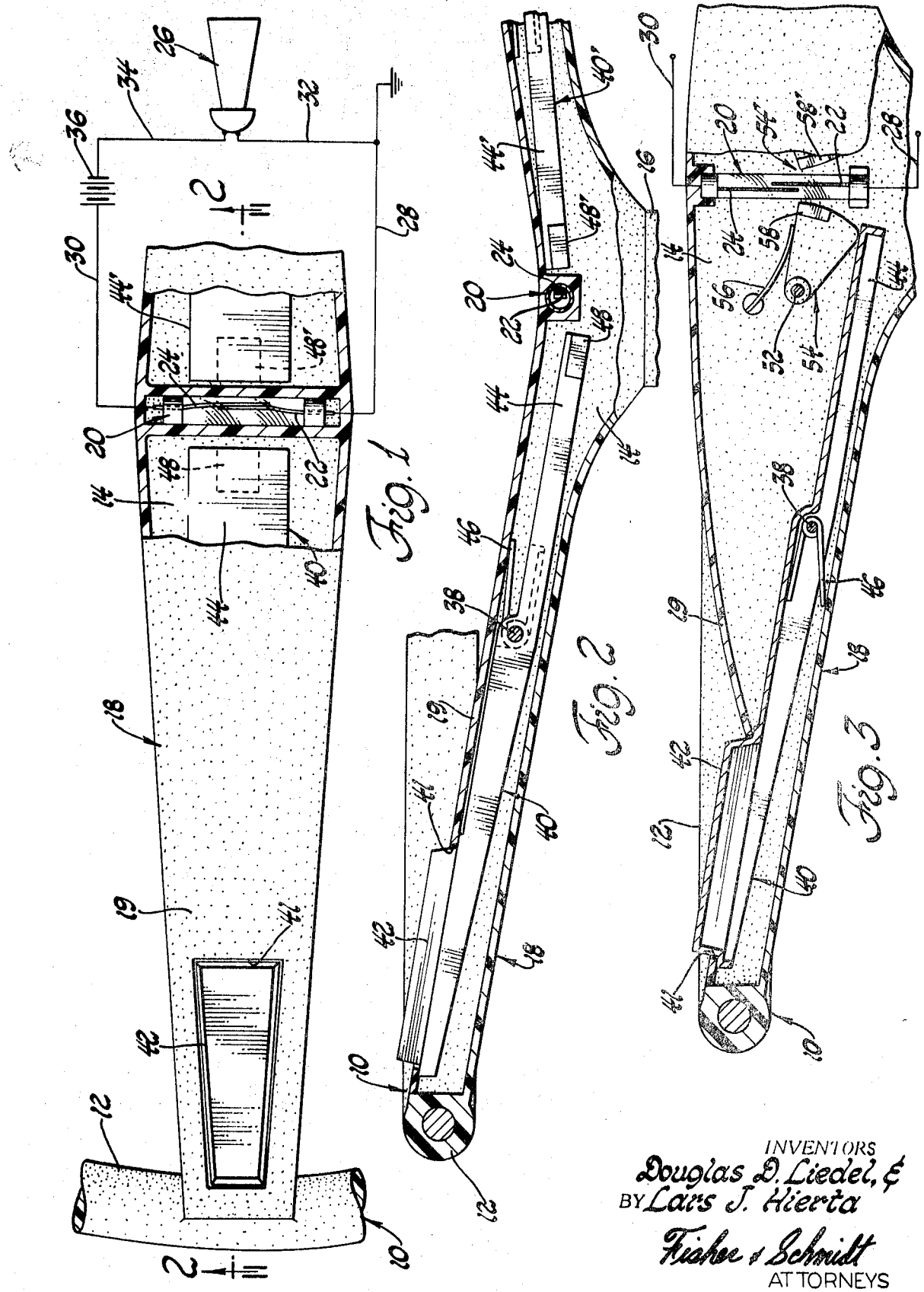

PATENTED DEC 14 1971 3,627,958
SHEET 2 OF 2
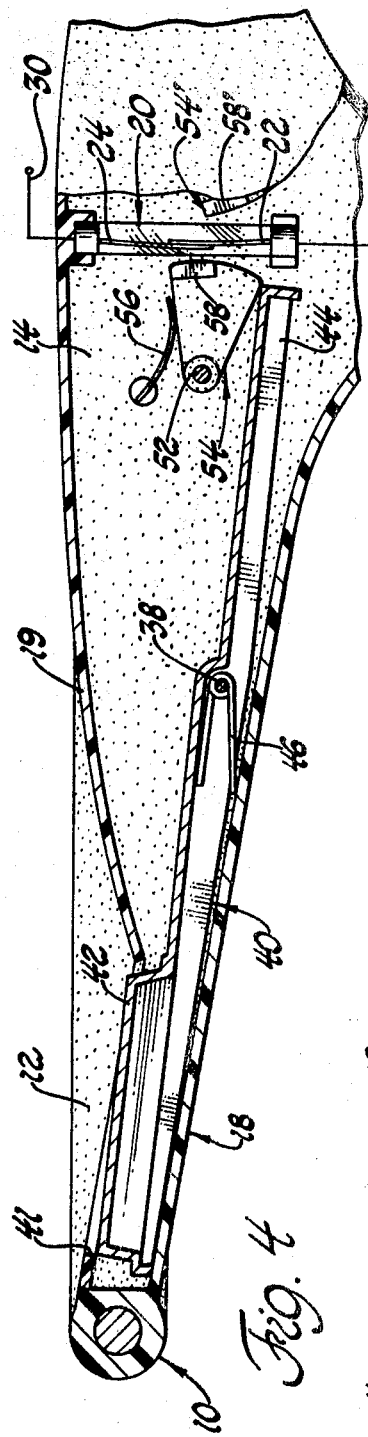
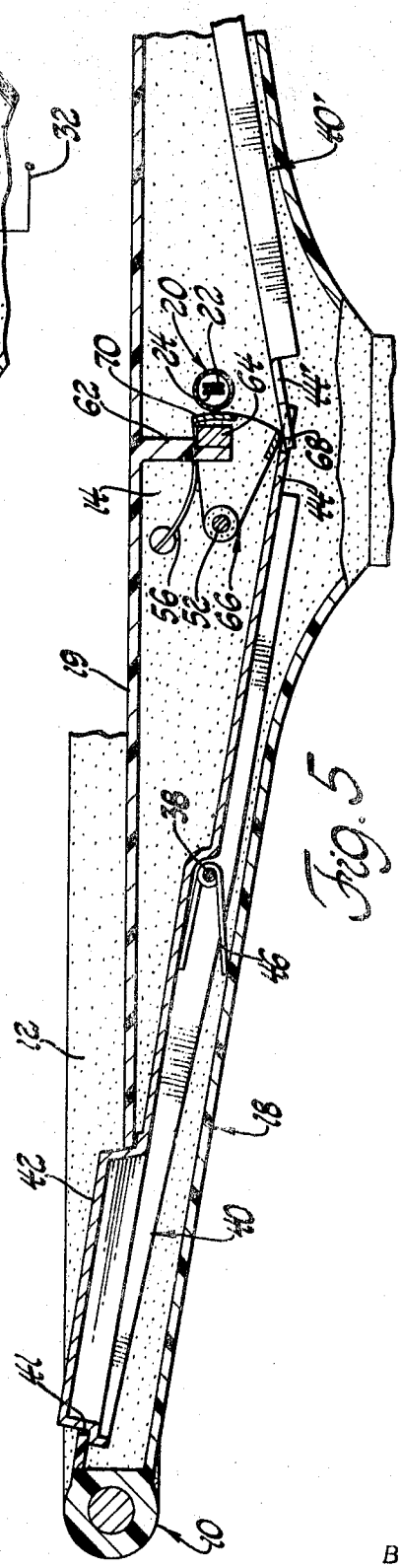
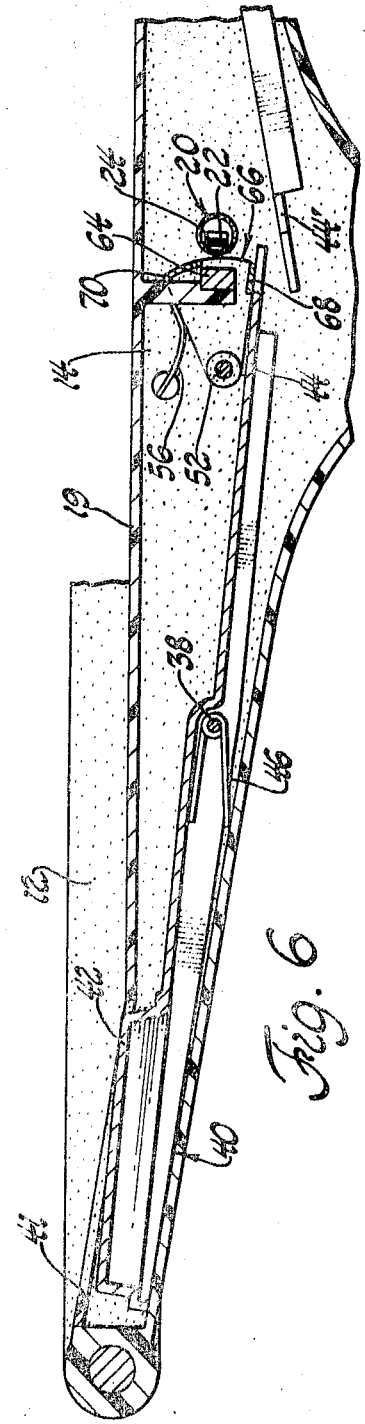
INVENTORS
Douglas D. Liedel, &
BY Lars J. Hierta
Fisher & Schmidt
ATTORNEYS

MAGNETIC HORN SWITCH

DISCLOSURE

This invention relates to means for operating an appliance from a remote position, and more particularly to means associated with a vehicle steering wheel or the like for operating a horn or other appliance in a motor vehicle.

In the design, operation and manufacture of many articles and structures there is a need to operate an appliance from a remote position. Typical of such structures or articles is a motor vehicle in which such an appliance, as the vehicle signal horn, is operated from the vehicle steering wheel. It is the general practice to provide some sort of electrical circuit operating means in the steering wheel which may be actuated by the vehicle operator, closing the electrical circuit to the horn or other appliance located under the hood or at some other remote location. It is apparent that in providing such actuation means, care must be taken to permit the actuation regardless of the position of the steering wheel and in such location as to be readily and immediately accessible for operation by the vehicle operator.

There are as many known methods of operating appliances from the vehicle steering wheel as there are different motor vehicles. However, most of these are devices that are mechanically operated; i.e., some mechanical movement takes place to close a switch in an electrical circuit to the horn or other appliance. Most familiar is the horn ring, concentrically disposed within the steering wheel rim and depressable at any position therearound against a spring mounting arrangement and which, upon depression, completes a circuit to a vehicle horn. Another well-known device is the contact means disposed within the steering wheel rim and operated by squeezing the rim at any point around the periphery thereof. Such squeezing causes mechanical contact to be made between tow circuit elements and thus to the vehicle horn.

Such devices that have been known in the past are expensive and difficult to manufacture, assembled and produce, and are subject to rapid wear through continued flexing, vibration, movement or the like. It is not uncommon for such devices to become readily inoperative because of parts vibrating loose, or because of the improper pressure applied, or because the pressure is not applied in an even manner or at the proper point. With particular reference to the vehicle horn, it is imperative that the operation be immediate, positive and always present for the safety of the vehicle operator and occupants.

The device in which this invention is embodied comprises, generally, a means for operating an appliance such as a horn from the steering wheel of the vehicle and to do so by means of magnetic operation to close the contact members in a switch disposed in the electrical circuitry to the vehicle horn. A switch, having contact members that are normally in open-spaced relation, is disposed in the hub of a steering wheel and suitable wiring connects the switch to the horn and to the vehicle power supply. A radial strut may extend from the hub of the steering to the peripheral rim. A lever is pivotally mounted in the strut and has an end adjacent the rim for ready depression by the vehicle operator. Also disposed in the vehicle hub is a magnetic flux field producing means which may be disposed adjacent the contact members of the switch assembly. Such means are associated with the inner end of the lever such that depression of the outer end of the lever places the contact members within the flux field of the magnetic device, thus, closing the contacts and completing the circuit to the horn.

In one modification of the invention, a magnet is mounted in the inner end of the lever, such that in the normal position the flux field produced by the magnet does not encompass the contact members of the switch. When the outer end of the lever is depressed, the magnet is moved to a position placing the contact members within the flux field and the magnetic attraction causes them to close. In a second modification of the invention, a carrier is pivotally mounted in the hub portion of the steering wheel and engages the inner end of the pivotal lever. A magnet is secured on the carrier, and in the normal position such magnet is disposed away from the contact members of the switch so that the magnetic flux field does not cause the required attraction. As the outer end of the lever is depressed, the carrier is raised to place the magnet adjacent the contact members, causing the necessary attraction and closing of the contact members and completing the electrical circuit to the horn or other appliance. In a third modification of the invention, a magnetic member is rigidly mounted in the hub portion of the steering wheel and a carrier is pivotally mounted adjacent thereto. The carrier includes a magnetic flux deflecting or diverting member which, in normal position, is disposed between the magnet and the contact members to divert the flux field and not attract the contact members. As the carrier is raised by the pivotal lever, the flux-deflecting member is removed from its position between the magnet and the contact members so that the flux field produced by the magnet encompasses the contact members and causes them to close.

An operating means constructed and assembled as described in the foregoing provides simple and economical operating means for an appliance from a remote position. The magnetic attraction is a positive actuation for the switch contact members and is immediate in its actuation to a closing position. There are relatively few parts in the assembly, thus simplifying manufacture and assembly and requiring little repair or replacement over a period of time. The overall results are an extremely inexpensive and efficient means for operating an appliance from a remote position, positive in operation and immediate in response to actuation by the vehicle operator.

These and other objects and advantages of the invention will become more apparent from the following description, used to illustrate preferred embodiments of the invention when taken with the accompanying drawings, in which:

FIG. 1 is a partial plan view, with parts broken away and in section, of a motor vehicle steering wheel in which the invention is embodied;

FIG. 2 is a partial cross-sectional view of the steering wheel illustrated in FIG. 1, taken substantially along the line 2–2 of FIG. 1 and looking in the direction of the arrows, to illustrate the position of the various parts;

FIG. 3 is a cross-sectional view of the steering similar to FIG. 2, illustrating a modification of the device shown in FIGS. 1 and 2 and illustrating the parts in one position of operation;

FIG. 4 is a view similar to FIG. 3 showing the parts in another position of operation;

FIG. 5 is a view similar to FIG. 2, showing another modification of the invention illustrated in FIGS. 1 and 2, showing the parts in one position of operation;

FIG. 6 is a view similar to FIG. 5, showing the parts in another position of operation.

Referring more particularly to the drawings, where the various figures are for the purpose of illustrating preferred embodiments of the invention only and not for purposes of limiting same, FIGS. 1 and 2 show a preferred embodiment of the invention as associated with a steering wheel of a motor vehicle. As shown in FIGS. 1 and 2, the steering wheel, indicated generally by the numeral 10, includes an outer peripheral rim portion 12 which is used and grasped by the vehicle operator in the conventional manner. A hub portion, indicated generally by the numeral 14, is associated with and connected to the vehicle steering column 16 in any well-known and suitable manner.

A radial strut, indicated generally by the numeral 18, extends between the hub portion 14 of the steering wheel 10 and the peripheral rim 12 and may support the rim 12 on the hub portion 14. Strut 18 is a channel affair, closed at the top by a cover member 19. Disposed within the hub portion 14 and secured in the cover 19 is a switch means, indicated generally by the numeral 20, which may conveniently be of the type known as a reed switch having reed contacts 22 and 24 normally disposed in open and spaced relation and requiring the contacts 22 and 24 to be engaged in order to complete a circuit.

Located at a remote position from the steering wheel and schematically illustrated in FIG. 1 is an appliance, such as the vehicle signal horn, indicated generally by the numeral 26. Suitable electrical circuitry, including conductors 28, 30, 32 and 34, connect the switch means 20 to the power supply, such as battery 36 or usual generator, to the signal horn 26. It will be apparent that when the contact members 22 and 24 are closed a circuit is completed to the horn 26 and through a power supply 36 to cause the horn to blow.

Disposed within the strut 18, and at a suitable location between the hub portion 14 and the rim 12, is a transverse pivot pin 38. Also disposed within the strut 18 is a lever, indicated generally by the numeral 40, such lever having an enlarged portion 42 at the end adjacent the steering wheel rim 12 and extending outwardly through an opening 41 formed in the cover 19 of the strut 18. The lever 40 is mounted on the pivot pin 38 for pivotal movement in a plane generally normal to the steering wheel rim 12, and the innermost end 44, operably connected to the lever 40 is positioned adjacent the switch means 20. A torsion spring 46, suitably disposed around the pivot pin 38 and acting between the strut cover 19 and the lever 40, maintains the lever in the position shown in FIG. 2.

Mounted in the inner end 44 of lever 40 is a magnet 48 which moves with the lever as the lever is depressed at the outer end. Such movement disposes the magnet in a position adjacent to the switch 20 and when in such position, the contact members 22 and 24 are attracted by the magnetic flux field of the magnet 48 and closed to complete the circuit to the horn 26. Thus, when the enlargement 42 is depressed, as by the thumb of the operator, the lever 44 pivots about the pin 38 to an appliance-operating position.

It will be apparent that a similar strut and cover can be provided at the opposite side of the steering wheel, to extend from the hub portion 14 to the peripheral rim 12, and a lever 40' similarly constructed and disposed for actuation from the opposite side of the steering wheel. A magnet 48' is movable from a nonoperating position, such as shown at the left-hand side of FIG. 2, to an operating position, such as shown at the right-hand side of FIG. 2, to attract the contact members 22 and 24 and close the circuit to the horn 26.

With reference now to FIGS. 3 and 4, a second preferred embodiment of the invention is illustrated in which generally like parts carry like reference numerals. The steering wheel 10 includes the peripheral outer rim 12 and a hub portion 14, connected by a radial strut 18 and cover 19. The lever 40, with an enlargement 42 extending through the opening 41 in the cover 19, is pivotally mounted on pivot pin 38 disposed in the strut 18, and the lever 40 is maintained in the position shown by a torsion spring 46. A switch means 20, with contact members 22 and 24, is disposed in the hub portion 14 and electrical conductors 28 and 30 operably connect the switch 20 with the appliance, such as horn 26.

Disposed transversely of the hub portion 14 is a second pivot pin 52 on which is mounted a carrier, indicated generally by the numeral 54. Carrier 54 is rotatable about the pin 52 and is held in a downward position abutting the inner end 44 of the lever 40 by a spring 56. Mounted on the carrier 54 is a magnet 58, adapted to produce a magnetic flux field for operation of the switch 20.

It will be apparent that when the carrier 54 and magnet 58 are in the position illustrated in FIG. 3, the contact members 22 and 24 are maintained in a spaced relationship to break the circuit to the horn 26. Upon depression of the lever 40, as is illustrated in FIG. 4, the magnet 58 and carrier 54 are raised to a position such that the contact members 22 and 24 are encompassed by the magnetic flux field from the magnet 58, causing the contact members 22 and 24 to close and complete the circuit to the horn 26. It will be apparent that a similar assembly can be provided at the opposite side of the hub portion 14, as heretofore described with respect to FIGS. 1 and 2, to provide horn actuation at the opposite side of the steering wheel in like manner.

With reference now to FIGS. 5 and 6, yet another preferred embodiment of the invention is illustrated and in which like parts carry like reference numerals. The steering wheel 10 again includes a peripheral rim 12 and a hub portion 14 connected by a suitable strut 18 covered by member 19. Disposed in the strut 18 is a lever 40, pivotally mounted on a pivot pin 38 and held in the position shown in FIG. 5 by a suitable torsion spring 46. An enlargement 42 at the outer end of lever 40 extends through opening 41 in cover 19 and provides a means to depress the lever by the operator from a position adjacent the steering wheel rim.

Disposed in the hub portion 14 of the wheel 10 is a rib 62 in which is rigidly mounted a magnet 64. Magnet 64 is in a position adjacent the switch 20 to attract the contact members 22 and 24. Also disposed in the hub portion 14 is a pivot pin 52 on which is rotatably mounted a carrier, indicated generally by the numeral 66. The lower portion of carrier 66 includes a flange 68 adapted to be engaged by the inner end 44 of lever 40 or the inner end 44' of lever 40'. Also formed on the carrier 66 is a magnetic flux deflecting or diverting member, indicated generally by the numeral 70. Such member is normally disposed between the magnet 64 and the switch 20 and is of such material that the magnetic flux field from the magnet 64 is more easily passed through or along the member 70 than through the airgap between the magnet 64 and the contact members 22 and 24. In other words, the diverting member 70 prevents the magnetic flux field from reaching the contact members and causing their closure when disposed between the magnet 64 and the contact members 22 and 24.

Upon depression of enlargement 42 at the outer end of the lever 40, or a similar enlargement at the outer end of the lever 40', the parts assume the position shown in FIG. 6 with the flux-diverting member 70 withdrawn from the gap between the magnet 64 and the contact members 22 and 24. In such position, the contact members are within the magnetic flux field produced by the magnet to close the contact members 22 and 24 and complete the circuit to the horn 26. When the lever 40 is released, so that the torsion spring 46 returns the lever to the position shown in FIG. 5, the spring 56 acts against the carrier 66 to return the carrier to its downward position illustrated in FIG. 5.

Thus, a magnetic appliance actuation means is provided for an appliance located at a point remote from the operating means. It is readily apparent that such form of operation is positive and immediate. The assembly includes a few number of parts, with little movement to require repair and replacement over a period to time. The device is simple to manufacture and assemble, thus creating an efficient and economical control means for the remote appliance.

What is claimed is:

1. In a steering wheel having a hub and a peripheral rim and a radial strut extending from said hub to said rim, appliance-operating means comprising:
   switch means mounted in said hub and including normally open contact members;
   electric circuit means operatively connecting said switch means to an appliance;
   magnetic flux generating means disposed in said hub to effect a magnetic attraction of said contact members when said contact members are exposed thereto;
   and means in said hub for effecting exposure of said contact members to the magnetic attraction of said magnetic flux generating means to close said contact members and actuate said appliance.

2. The appliance-operating means set forth in claim 1, and further including a lever pivotally mounted in said strut and having one end adjacent said switch means and the other end adjacent said peripheral rim, said one end being operably connected to said magnetic flux generating means and being operable by movement of said other end to expose said contact members to the magnetic attraction of said magnetic flux generating means.

3. The appliance-operating means set forth in claim 2, wherein said magnetic flux generating means includes a magnetic member mounted in said one end of said lever and moveable therewith from a nonattracting position to an attracting position with movement of said other end of said lever.

4. The appliance-operating means set forth in claim 2, and further including a carrier pivotally mounted in said hub for containing said magnetic flux generating means, said one end of said lever engaging said carrier and being adapted to move said carrier with movement of said other end of said lever, said movement of said carrier disposing said magnetic flux generating means in attracting position relative to said contact members.

5. The appliance-operating means set forth in claim 2, wherein said magnetic flux generating means is permanently mounted in said hub and adjacent said switch means.

6. The appliance-operating means set forth in claim 5 and further including a carrier pivotally mounted in said hub and having magnetic flux diverting means disposable between said magnetic flux generating means and said contact members to interrupt the magnetic field from said magnetic flux generating means to said contact members in one position of operation, said carrier being engaged by said one end of said lever and movable thereby with movement of said other end of said lever to remove said flux-diverting means from between said magnetic flux generating means and said contact members and permit said magnetic flux generating means to attract said contact members for engagement.

7. In a steering wheel having a hub and a peripheral rim and a radial strut extending therebetween, appliance-operating means for operating an appliance and comprising;

switch means mounted in said hub and having normally open contact members;

electric circuit means operatively connecting said switch means to said appliance;

a lever pivotally mounted in said strut for movement in a plane normal to the plane of said rim, said lever having one end adjacent said switch means and the other end adjacent said rim;

magnetic flux generation means in said hub for providing a magnetic field;

and means in said hub and operably connected to said lever for directing said magnetic field to said contact members, said means having one position for attracting said contact members into closed and electrical current passing relation and another position wherein said contact members are outside of said magnetic field.

8. The appliance-operating means set forth in claim 7, wherein said means in said hub for providing said magnetic field includes a magnet mounted in said one end of said lever adjacent said switch means.

9. The appliance-operating means set forth in claim 7, wherein said means in said hub for directing said magnetic field includes a carrier pivotally mounted in said hub and engaging said one end of said lever and rotatable between said one position and said another position by movement of said other end of said lever.

10. The appliance-oprating means set forth in claim 9, wherein said means for providing said magnetic field is mounted on said carrier and is moveable therewith.

11. The appliance-operating means set forth in claim 9, wherein said means for providing said magnetic field is rigidly mounted in aid hub, and said carrier includes magnetic flux diverting means moveable between said one position and said other position by movement of said other end of said lever.

* * * * *